United States Patent
Zhao et al.

(10) Patent No.: US 8,666,359 B2
(45) Date of Patent: Mar. 4, 2014

(54) NOTIFICATION METHOD, SYSTEM AND APPARATUS FOR AN EMERGENCY AREA ID

(75) Inventors: Yi Zhao, Shenzhen (CN); Tao Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,256

(22) PCT Filed: Apr. 27, 2010

(86) PCT No.: PCT/CN2010/072244
§ 371 (c)(1),
(2), (4) Date: Mar. 13, 2012

(87) PCT Pub. No.: WO2011/032385
PCT Pub. Date: Mar. 24, 2011

(65) Prior Publication Data
US 2012/0196559 A1    Aug. 2, 2012

(30) Foreign Application Priority Data
Sep. 18, 2009   (CN) .......................... 2009 1 0093331

(51) Int. Cl.
*H04W 4/22*    (2009.01)
(52) U.S. Cl.
USPC ........................................ 455/404.1; 370/331
(58) Field of Classification Search
USPC ................ 370/331, 401; 455/404.1, 561
See application file for complete search history.

(56) References Cited

U.S. PATENT DOCUMENTS

2010/0329208 A1* 12/2010 Hayashi et al. ................ 370/331
2011/0165855 A1*  7/2011 Hapsari et al. .............. 455/404.1

FOREIGN PATENT DOCUMENTS

| CN | 101390430 A | 3/2009 |
|----|-------------|--------|
| CN | 101499939 A | 8/2009 |
| JP | 2007156766 A | 6/2007 |
| JP | 2010178322 A | 8/2010 |
| JP | 2012529098 A | 11/2012 |

OTHER PUBLICATIONS

3GPP RAN3#61; S1AP procedures to support ETWS in E-UTRAN; Aug. 18-22, 2008, Jeju Island, Korea.*
International Search Report on international application No. PCT/CN2010/072244, mailed on Aug. 5, 2010.
English Translation of the Written Opinion of the International Search Authority in international application No. PCT/CN2010/072244, mailed on Aug. 5, 2010.
3GPP RAN 3#61 ; SIAP procedures to Support ETWS in E-UTRAN.

* cited by examiner

*Primary Examiner* — Patrick Edouard
*Assistant Examiner* — Myron K Wyche
(74) *Attorney, Agent, or Firm* — Oppedahl Patent Law Firm LLC

(57) ABSTRACT

The disclosure provides a notification method for an Emergency Area ID, including: an evolution node B (eNB) acquires an eNB-supported Emergency Area ID and an E-UTRAN cell global identifier (E-CGI) list included in it, and when S1 is set up, carries the acquired emergency area ID and the E-CGI list included in it in an S1 setup request message to transmit to a mobility management entity (MME); the MME stores the received emergency area ID and the E-CGI list included in it. The disclosure further provides a notification system for an Emergency Area ID. With the disclosure, the complexity of manual operation and the error rate are decreased, the reliability and operating efficiency of the system are improved, and the stability and maintainability of the system are enhanced.

15 Claims, 2 Drawing Sheets

NOTIFICATION METHOD, SYSTEM AND APPARATUS FOR AN EMERGENCY AREA ID

TECHNICAL FIELD

The disclosure relates to a warning processing technology in a long term evolution (LTE) system, in particular to a notification method, system and apparatus for an Emergency Area ID.

BACKGROUND

In a Long Term Evolution (LTE) system, when there is a warning message required to be notified to User Equipment (UE) at a network side, a Mobility Management Entity (MME) will initiate Warning Message Transmission Procedures to an evolved Node B (eNB) connected with the MME through an S1 interface according to an actual situation, and notify the eNB to broadcast the warning message to the UE located in a related area to which the eNB belongs. The S1 interface is an interface in the LTE system and is used for connecting the MME and the eNB. Aforementioned warning message is usually the one related to an Earthquake And Tsunami Warning System (ETWS).

According to the provisions in the current protocol 36.413, when there is a warning message to be sent, an MME sends a WRITE-REPLACE WARNING REQUEST message to an eNB through the Warning Message Transmission Procedures; after the eNB finishes the processing, it returns a WRITE-REPLACE WARNING RESPONSE message to the MME.

When the MME carries a Warning Area List in the WRITE-REPLACE WARNING REQUEST message and the Warning Area List includes an Emergency area ID, after the eNB finishes the processing, the WRITE-REPLACE WARNING RESPONSE message which is to be sent to the MME will include a Broadcast Completed Area List, and the Broadcast Completed Area List will include an Emergency Area ID which successfully sent a warning message and an E-UTRAN Cell Global Identifier (E-CGI) which successfully sent broadcast under the Emergency Area ID.

However, the Emergency Area IDs on the eNB side and the MME side are all manually configured by operators at present, therefore, the operators have a heavy workload and are prone to make a mistake, and the later maintenance is not convenient.

SUMMARY

In view of these, the disclosure mainly aims to provide a notification method, system and apparatus for an Emergency Area ID, so as to solve the problems caused by the manual configuration of an Emergency Area ID on an eNB side and an MME side, including: the workload is heavy, the operation is not convenient, it is error-prone and the later maintenance is not convenient.

For achieving the above aim, the technical solution of the disclosure is realized in such way:

the disclosure provides a notification method for an Emergency Area ID, including:

acquiring, by an eNB, an Emergency Area ID supported by the eNB itself and an E-UTRAN cell global identifier (E-CGI) list included in the Emergency Area ID, and when S1 is set up, carrying the acquired emergency area ID and the E-CGI list included in it in an S1 SETUP REQUEST message and transmitting this message to a mobility management entity (MME); and storing, by the MME, the received emergency area ID and the E-CGI list included in it.

Before the eNB acquires an Emergency Area ID and an E-CGI list included in it, the method may further include: configuring an Emergency Area ID supported by the eNB and an E-CGI list included in the Emergency Area ID on the eNB.

The Emergency Area ID and the E-CGI list included in it may be at any position in the S1 SETUP REQUEST message.

the method may further include:

after the S1 is set up, if the Emergency Area ID supported by the eNB and the E-CGI list included in it change, then reacquiring, by the eNB, an Emergency Area ID supported by the eNB itself and an E-CGI list included in it, and carrying the reacquired Emergency Area ID and the E-CGI list included in it in an eNB configuration update message and transmitting this message to the MME; and updating, by the MME, the stored Emergency Area ID and the E-CGI list included in it, according to the Emergency Area ID and the E-CGI list included in it in the eNB Configuration Update message.

The disclosure further provides a notification system for an Emergency Area ID, including: an eNB and an MEE, wherein the eNB is adapted to acquire an Emergency Area ID supported by the eNB itself and an E-CGI list included in the Emergency Area ID, and when S1 is set up, to carry the acquired Emergency Area ID and the E-CGI list included in it in an S1 setup request message and transmit this message to the MME;

the MME is adapted to store the received Emergency Area ID and the E-CGI list included in it.

The eNB may be further adapted to configure an Emergency Area ID supported by the eNB itself and an E-CGI list included in the Emergency Area ID.

The Emergency Area ID and the E-CGI list included in it may be at any position in the S1 SETUP REQUEST message;

The eNB may be further adapted to, after the S1 is set up and when the Emergency Area ID supported by the eNB itself and the E-CGI list included in it change, reacquire an Emergency Area ID supported by the eNB itself and an E-CGI list included in the Emergency Area ID, and carry the reacquired emergency area ID and the E-CGI list included in it in an eNB CONFIGURATION UPDATE message and transmit this message to the MME;

correspondingly, the MME may be further adapted to update the stored Emergency Area ID and the E-CGI list included in it, according to the emergency area ID and the E-CGI list included in it in the eNB CONFIGURATION UPDATE message.

The disclosure further provides an eNB, including:

an information acquiring module for acquiring an Emergency Area ID supported by the eNB and an E-CGI list included in the Emergency Area ID;

a message sending module for, when S1 is set up, carrying the acquired emergency area ID and the E-CGI list included in it in an S1 SETUP REQUEST message and transmitting this message to the MME.

The information acquiring module may be further adapted to, after the S1 is set up and when the Emergency Area ID supported by the eNB and the E-CGI list included in it change, reacquire an Emergency Area ID supported by the eNB and an E-CGI list included in the Emergency Area ID;

correspondingly, the message sending module may be adapted to carry the reacquired emergency area ID and the E-CGI list included in it in an eNB CONFIGURATION UPDATE message and transmit this message to the MME.

The disclosure further provides an MME, including:

a message receiving module for receiving an S1 SETUP REQUEST message and/or an eNB CONFIGURATION UPDATE message from an eNB; and an information storing module for storing an Emergency Area ID and an E-CGI list included in the Emergency Area ID which are included in the S1 SETUP REQUEST message and/or the eNB CONFIGURATION UPDATE message.

In the notification method, system and apparatus for an Emergency Area ID provided by the disclosure, an Emergency Area ID is only configured at an eNB, and then is included in an S1 setup request message and an eNB configuration update message to be transmitted to an MME; the MME updates the emergency area ID information of the eNB in real time, and when there is a warning message needed to be notified to the eNB, the emergency area ID reported by the eNB is included in a Warning Area List. With the disclosure, the operation of manually configuring an Emergency Area ID at the MME is omitted, thereby the complexity of manual operation and the error rate are decreased, the reliability and operating efficiency of the system are improved, and the stability and maintainability of the system are enhanced.

DETAILED DESCRIPTION

The technical solution of the disclosure is described below with reference to the accompanying drawings and embodiments in detail.

Figure 1:
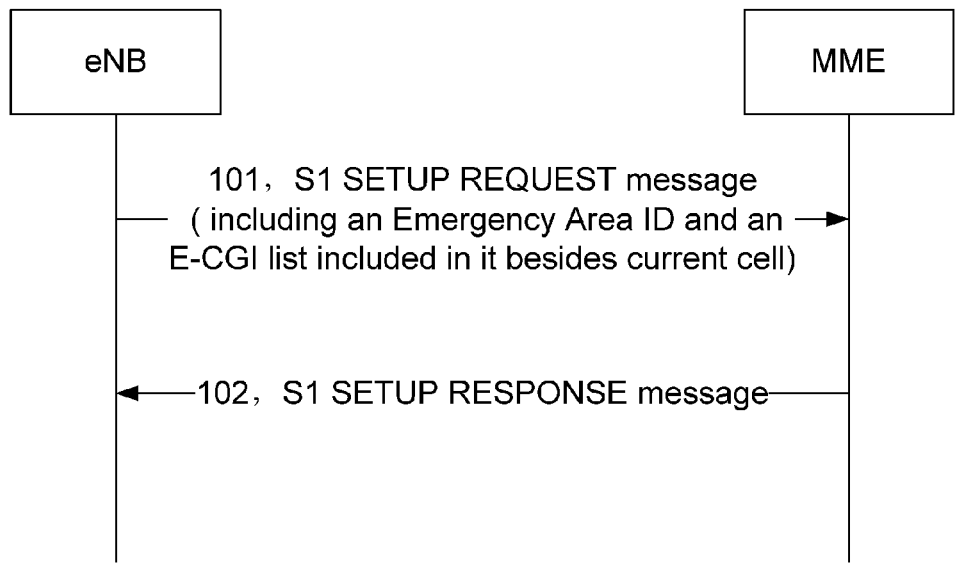
FIG. 1 shows a flowchart 1 of a notification method for an Emergency Area ID of the disclosure.

A notification method for an Emergency Area ID provided by the disclosure can be applied in two application scenes. The first application scene is: when S1 is set up, an eNB carries Emergency Area ID information supported by the eNB itself in an S1 SETUP REQUEST message to transmit this information to the MME; The specific operating procedures are shown in FIG. 1, mainly comprising the following steps:

step 101: the eNB acquires an Emergency Area ID supported by the eNB itself and an E-CGI list included in the Emergency Area ID, and when S1 is set up, the eNB carries the acquired Emergency Area ID and the E-CGI list included in it in an S1 Setup Request message and transmits this message to the MME;

the Emergency Area ID and the E-CGI list included in it are pre-configured on the eNB by operators. The eNB attaches the acquired emergency area ID and the E-CGI list included in it behind the current cell of the S1 SETUP REQUEST message and then transmits them to the MME after the S1 SETUP REQUEST message is encoded;

it should be noted that, the eNB can set the emergency area ID supported by the eNB itself and the E-CGI list included in it at any position in the S1 SETUP REQUEST message;

step 102: the MME stores the received Emergency Area ID and the E-CGI list included in it, and returns an S1 SETUP RESPONSE message to the eNB;

after receiving the S1 SETUP REQUEST message, the MME extracts the Emergency Area ID and the E-CGI list included in the Emergency Area ID from the message and stores them; in addition, the MME also needs to process other cells included in the S1 SETUP REQUEST message, and returns the S1 SETUP RESPONSE message to the eNB after the processing is successfully finished.

Figure 2:
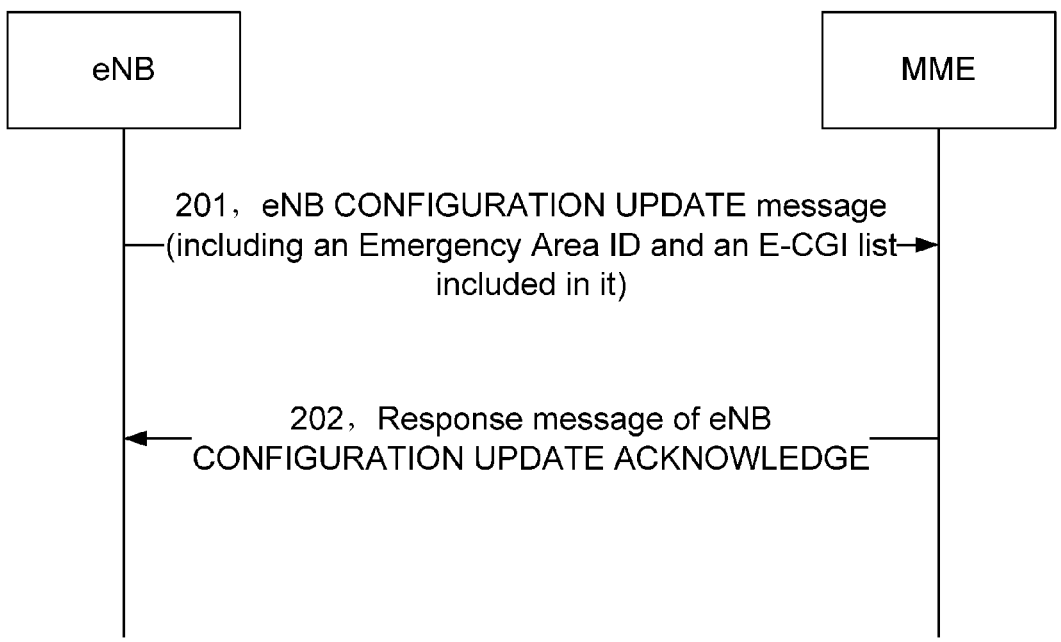
FIG. 2 shows a flowchart 2 of a notification method for an Emergency Area ID of the disclosure.

The second application scene is: after the S1 is set up and when the Emergency Area ID information supported by the eNB itself changes, the eNB carries the eNB-supported emergency area ID information to the MME via an eNB CONFIGURATION UPDATE message. The specific operating procedures are shown in FIG. 2, mainly comprising the following steps:

step 201: when the eNB-supported Emergency Area ID and the E-CGI list included in it change, the eNB reacquires an Emergency Area ID supported by the eNB itself and an E-CGI list included in the Emergency Area ID, and carries the acquired Emergency Area ID and the E-CGI list included in it in an eNB CONFIGURATION UPDATE message and transmits this message to the MME;

when the Emergency Area ID and the E-CGI list included in it are triggered to change by a manual configuration on the eNB, the eNB can learn the change event by calculating and reacquires an Emergency Area ID supported by the eNB itself and an E-CGI list included in it;

step 202: the MME updates the Emergency Area ID stored in the MME and the E-CGI list included in the Emergency Area ID according to the Emergency Area ID and the E-CGI list included in it in the eNB CONFIGURATION UPDATE message, and returns a response message of eNB CONFIGURATION UPDATE ACKNOWLEDGE to the eNB.

After receiving the eNB CONFIGURATION UPDATE message, the MME learns that the Emergency Area ID and the E-CGI list included in it of the corresponding eNB change, and then it updates the early stored Emergency Area ID and the E-CGI list included in it of this eNB with the Emergency Area ID and the E-CGI list included in it which are included in the eNB CONFIGURATION UPDATE message, and returns eNB CONFIGURATION UPDATE ACKNOWLEDGE as a response message to the eNB.

The notification method for an Emergency Area ID is described below with reference to embodiment in detail. In the embodiment, the operators pre-configure an Emergency Area ID as 1 on the eNB, and the E-CGIs included in the Emergency Area ID are 0, 1, and 2. When the S1 is set up, the eNB acquires information that the Emergency Area ID is 1 and the E-CGIs included in the Emergency Area ID is 0, 1 and 2, and carries the acquired information in the S1 SETUP REQUEST message to transmit it to the MME; after the MME receives the S1 SETUP REQUEST message, the MME extracts and stores the information that the Emergency Area ID is 1 and the E-CGIs included in the Emergency Area ID are 0, 1 and 2, and then returns an S1 SETUP RESPONSE message to the eNB.

After the S1 is set up, supposing that the operators add an emergency area ID which is 2 on the eNB, and the E-CGIs included in the Emergency Area ID are 2, 3, 4, and 5, while modifying the E-CGIs included in the Emergency Area ID which is 1 into 1 and 6. When learning that the information of the Emergency Area ID changes, the eNB reacquires Emergency Area IDs supported by the eNB itself and E-CGI lists included in them, namely, the information that the Emergency Area ID is 1 and the E-CGIs included in it are 1 and 6, and the information that the Emergency Area ID is 2 and the E-CGIs included in it are 2, 3, 4 and 5; the eNB carries the above reacquired information in the eNB CONFIGURATION UPDATE message to transmit it to the MME; after receiving the eNB CONFIGURATION UPDATE message, the MME learns that the information of the Emergency Area ID changes, and then it updates the early stored information of the Emergency Area ID (namely, the Emergency Area ID is 1, and the cells included in it are 0, 1 and 2) of the eNB with the information of Emergency Area IDs (namely, the Emergency Area ID is 1, and the cells included in it are 1 and 6; the Emergency Area ID is 2, and the cells included in it are 2, 3, 4 and 5) included in the eNB CONFIGURATION UPDATE message; subsequently, the MME returns the response message of eNB CONFIGURATION UPDATE ACKNOWLEDGE to the eNB.

Figure 3:
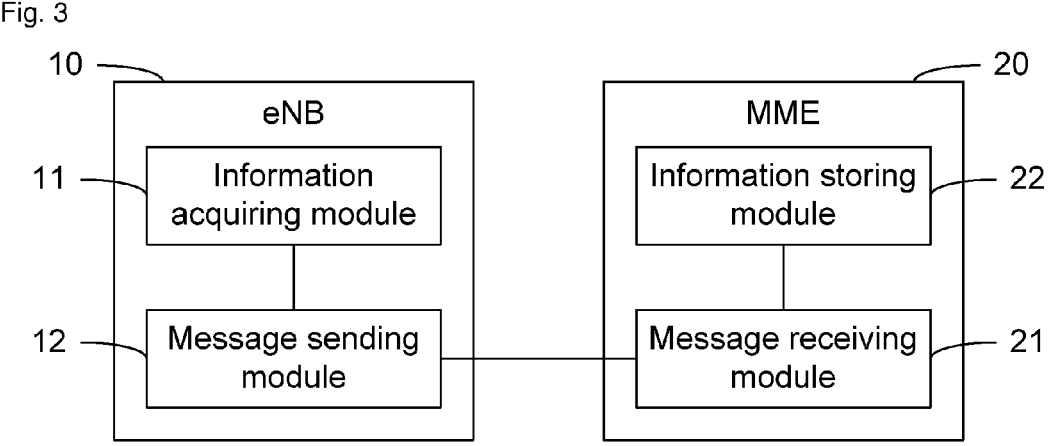
FIG. 3 shows a schematic diagram of the structure of a notification system for an Emergency Area ID of the disclosure.

For realizing the notification method for an Emergency Area ID, the disclosure further provides a notification system for an Emergency Area ID, which is composed of an eNB 10 and an MME 20, as shown in FIG. 3. The eNB 10 is adapted to acquire an Emergency Area ID supported by the eNB 10 itself and an E-CGI list included in the Emergency Area ID, and when S1 is set up, to carry the acquired Emergency Area ID and the E-CGI list included in it to the MME 20 via an S1 SETUP REQUEST message. The Emergency Area ID and the E-CGI list included in it are located at any position in the S1 SETUP REQUEST message. The MME 20 is adapted to store the received Emergency Area ID and the E-CGI list included in it.

The eNB 10 is further adapted to pre-configure an emergency area ID supported by the eNB 10 itself and an E-CGI list included in the emergency area ID. In addition, after the S1 is set up, if the Emergency Area ID supported by the eNB 10 and the E-CGI list included in it change, then the eNB 10 reacquires an Emergency Area ID supported by the eNB 10 itself and an E-CGI list included in it, and carries the reacquired Emergency Area ID and the E-CGI list included in it in an eNB CONFIGURATION UPDATE message and transmits this message to the MME 20. The MME 20 updates an Emergency Area ID and an E-CGI list included in it which are stored in the MME 20, according to the Emergency Area ID and the E-CGI list included in it in the eNB CONFIGURATION UPDATE message.

The eNB 10 further comprises: an information acquiring module 11 and a message sending module 12. The information acquiring module 11 is adapted to acquire the Emergency Area ID supported by the eNB 10 and the E-CGI list included in it. The message sending module 12 is adapted to, when the S1 is set up, carry the acquired emergency area ID and the E-CGI list included in it in the S1 setup request message and transmit this message to the MME 20.

The information acquiring module 11 is further adapted to, after the S1 is set up and when the Emergency Area ID supported by the eNB 10 and the E-CGI list included in it change, reacquire an emergency area ID supported by the eNB 10 and an E-CGI list included in the emergency area ID. Correspondingly, the message sending module 12 is further adapted to carry the reacquired Emergency Area ID and the E-CGI list included in it in the eNB CONFIGURATION UPDATE message and transmit this message to the MME 20.

The MME 20 further comprises: a message receiving module 21 and an information storing module 22. The message receiving module 21 is adapted to receive the S1 SETUP REQUEST message and/or the eNB CONFIGURATION UPDATE message from the eNB. The information storing module 22 is adapted to store the Emergency Area ID and the E-CGI list included in it which are included in the S1 SETUP REQUEST message and/or the eNB CONFIGURATION UPDATE message.

In summary, by applying the disclosure, the operation of manually configuring an Emergency Area ID at the MME is omitted, thereby the complexity of manual operation and the error rate are decreased, the reliability and operating efficiency of the system are improved, and the stability and maintainability of the system are enhanced.

The above are only better embodiments of the disclosure, and not used for limiting the protection scope of the disclosure.

The invention claimed is:

1. A notification method for an Emergency Area ID, comprising:
acquiring, by an evolved Node B (eNB), an Emergency Area ID supported by the eNB itself and an E-UTRAN cell global identifier (E-CGI) list included in the Emergency Area ID, and when S1 is set up, carrying the acquired Emergency Area ID and the E-CGI list included in it in an S1 SETUP REQUEST message and transmitting this message to a mobility management entity (MME); and storing, by the MME, the received Emergency Area ID and the E-CGI list included in it.

2. The notification method for an Emergency Area ID according to claim 1, further comprising: before the eNB acquires an Emergency Area ID and an E-CGI list included in it, configuring an Emergency Area ID supported by the eNB and an E-CGI list included in the Emergency Area ID on the eNB.

3. The notification method for an Emergency Area ID according to claim 1, wherein the Emergency Area ID and the E-CGI list included in it are at any position in the S1 SETUP REQUEST message.

4. The notification method for an Emergency Area ID according to claim 1, further comprising:
after the S1 is set up, if the emergency area ID supported by the eNB and the E-CGI list included in it change, then reacquiring, by the eNB, an Emergency Area ID supported by the eNB itself and an E-CGI list included in it, and carrying the reacquired Emergency Area ID and the E-CGI list included in it in an eNB CONFIGURATION UPDATE message and transmitting this message to the MME; and updating, by the MME, the stored Emergency Area ID and the E-CGI list included in it, according to the Emergency Area ID and the E-CGI list included in it in the eNB CONFIGURATION UPDATE message.

5. A notification system for an Emergency Area ID, comprising: an evolved Node B (eNB) and a mobility management entity (MEE), wherein
the eNB is adapted to acquire an Emergency Area ID supported by the eNB itself and an E-CGI list included in the Emergency Area ID, and when S1 is set up, to carry the acquired Emergency Area ID and the E-CGI list included in it in an S1 SETUP REQUEST message and transmit this message to the MME;
the MME is adapted to store the received Emergency Area ID and the E-CGI list included in it.

6. The notification system for an Emergency Area ID according to claim 5, wherein the eNB is further adapted to configure an Emergency Area ID supported by the eNB itself and an E-CGI list included in the Emergency Area ID.

7. The notification system for an Emergency Area ID according to claim 5, wherein the Emergency Area ID and the E-CGI list included in it are at any position in the S1 SETUP REQUEST message.

8. The notification system for an Emergency Area ID according to claim 5, wherein the eNB is further adapted to, after the S1 is set up and when the Emergency Area ID supported by the eNB itself and the E-CGI list included in it change, reacquire an Emergency Area ID supported by the eNB itself and an E-CGI list included in the Emergency Area ID, and carry the reacquired Emergency Area ID and the E-CGI list included in it in an eNB CONFIGURATION UPDATE message and transmit this message to the MME;
   correspondingly, the MME is further adapted to update the stored Emergency Area ID and the E-CGI list included in it, according to the Emergency Area ID and the E-CGI list included in it in the eNB CONFIGURATION UPDATE message.

9. An evolved Node B (eNB), comprising:
   an information acquiring module for acquiring an Emergency Area ID supported by the eNB and an E-CGI list included in the Emergency Area ID;
   a message sending module for, when S1 is set up, carrying the acquired Emergency Area ID and the E-CGI list included in it in an S1 SETUP REQUEST message and transmitting this message to the MME.

10. The eNB according to claim 9, wherein the information acquiring module is further adapted to, after the S1 is set up and when the Emergency Area ID supported by the eNB and the E-CGI list included in it change, reacquire an Emergency Area ID supported by the eNB and an E-CGI list included in the Emergency Area ID;
   correspondingly, the message sending module is adapted to carry the reacquired Emergency Area ID and the E-CGI list included in it in an eNB CONFIGURATION UPDATE message and transmit this message to the MME.

11. A mobility management entity (MME), comprising:
   a message receiving module for receiving an S1 SETUP REQUEST message and/or an eNB CONFIGURATION UPDATE message from an eNB; and
   an information storing module for storing an Emergency Area ID and an E-CGI list included in the Emergency Area ID which are included in the S1 SETUP REQUEST message and/or the eNB CONFIGURATION UPDATE message.

12. The notification method for an Emergency Area ID according to claim 2, wherein the Emergency Area ID and the E-CGI list included in it are at any position in the S1 SETUP REQUEST message.

13. The notification method for an Emergency Area ID according to claim 2, further comprising:
   after the S1 is set up, if the emergency area ID supported by the eNB and the E-CGI list included in it change, then reacquiring, by the eNB, an Emergency Area ID supported by the eNB itself and an E-CGI list included in it, and carrying the reacquired Emergency Area ID and the E-CGI list included in it in an eNB CONFIGURATION UPDATE message and transmitting this message to the MME; and updating, by the MME, the stored Emergency Area ID and the E-CGI list included in it, according to the Emergency Area ID and the E-CGI list included in it in the eNB CONFIGURATION UPDATE message.

14. The notification system for an Emergency Area ID according to claim 6, wherein the Emergency Area ID and the E-CGI list included in it are at any position in the S1 SETUP REQUEST message.

15. The notification system for an Emergency Area ID according to claim 6, wherein the eNB is further adapted to, after the S1 is set up and when the Emergency Area ID supported by the eNB itself and the E-CGI list included in it change, reacquire an Emergency Area ID supported by the eNB itself and an E-CGI list included in the Emergency Area ID, and carry the reacquired Emergency Area ID and the E-CGI list included in it in an eNB CONFIGURATION UPDATE message and transmit this message to the MME;
   correspondingly, the MME is further adapted to update the stored Emergency Area ID and the E-CGI list included in it, according to the Emergency Area ID and the E-CGI list included in it in the eNB CONFIGURATION UPDATE message.

* * * * *